United States Patent [19]

Metcalfe et al.

[11] Patent Number: 4,642,864

[45] Date of Patent: Feb. 17, 1987

[54] RECUPERATOR TUBE ASSEMBLY

[75] Inventors: Arthur G. Metcalfe, National City; Michael E. Ward, San Diego, both of Calif.

[73] Assignee: Solar Turbines Incorporated, San Diego, Calif.

[21] Appl. No.: 811,258

[22] Filed: Dec. 20, 1985

[51] Int. Cl.[4] .................. B21D 53/02; B23P 15/26
[52] U.S. Cl. ................ 29/157.3 R; 29/527.1; 29/DIG. 5; 29/DIG. 25; 228/122
[58] Field of Search .......... 29/157.3 R, 455 R, 527.1, 29/527.5, 33 G, 726, DIG. 23, 157 R, DIG. 5, DIG. 25; 403/404, 265, 267; 228/122, 123, 124, 903

[56] References Cited

U.S. PATENT DOCUMENTS

| | | | |
|---|---|---|---|
| 3,226,822 | 1/1966 | Budde et al. | 228/122 |
| 3,349,465 | 10/1967 | La Pan et al. | 29/157.3 R |
| 3,367,696 | 2/1968 | Zangley | 228/122 |
| 3,802,491 | 4/1974 | Plank, Jr. et al. | 29/157.3 R |
| 3,839,779 | 10/1974 | Walker | 228/122 |
| 3,930,536 | 1/1976 | Cherry et al. | 29/157.3 R |
| 3,958,631 | 5/1976 | Mentschel | 29/157.3 R |
| 4,050,956 | 9/1977 | de Bruin et al. | 228/122 |
| 4,193,180 | 3/1980 | Press | 29/157.3 R |

OTHER PUBLICATIONS

Kukral, Müller and Ottenberger. S. Phys. E (G.B.) vol. 4, No. 1, Jan. 1971, 65-6 thru 65-7.

*Primary Examiner*—Howard N. Goldberg
*Assistant Examiner*—Irene Graves Golabi
*Attorney, Agent, or Firm*—Robert A. McFall

[57] ABSTRACT

A ceramic to metal joint particularly advantageous in a recuperator tube assembly, includes a ceramic tube and a spaced, circumferentially disposed metal sleeve. A bonding material is cast between the ceramic and metal members. A seal member has sufficient ductility within a predetermined thermal operating range to plastically deform and yet maintain an effective fluid seal between the ceramic and metal members. The present invention is particularly useful in the construction of a modular heat exchanger unit. Both individual tube assemblies and module units can be individually removed for cleaning, inspection, or replacement.

11 Claims, 3 Drawing Figures

RECUPERATOR TUBE ASSEMBLY

DESCRIPTION

1. Technical Field

This invention relates generally to a joint construction for joining ceramic and metallic components, and more particularly to such a joint construction utilized in a recuperator or heat exchanger tube assembly.

2. Background Art

Ceramic and metallic materials typically have very different thermal expansion properties, a characteristic that has made it difficult to join members constructed of such diverse materials into single structural assemblies intended for use in high temperature environments. One attempt to join ceramic and metallic structural components is described in U.S. Pat. No. 4,499,646 issued Feb. 19, 1985 to Richard L. Allor et al. The Allor patent discloses a ceramic-metallic joint wherein one end of the ceramic component is threaded into the metallic member, and a yieldable expansion sleeve is positioned between the ceramic and metallic members. The expansion sleeve, constructed of a resinous material, is more ductile than ceramic or metallic materials, and has a thermal expansion rate greater than either of the dissimilar structural members. As a result, the expansion sleeve complies with the ceramic material and avoids high local contact stress between the ceramic and metal surfaces.

Joint constructions such as that typified by Allor et al, however, have a number of inherent shortcomings, and present additional problems. For example, threads are difficult to form in ceramic materials and they introduce high stress areas that are prone to cracking during repeated thermal cycling. Further, the relatively low temperature limitations of the resinous expansion member limits the thermal operating environment of assemblies incorporating such members.

Additional problems are encountered in adapting ceramic materials to high temperature heat exchangers. The biggest problem with present tube-type ceramic recuperators centers around the tube to header joints. Specifically, composite ceramic-metal heat exchangers have problems attributable to internal stresses resulting from unlike thermal expansion characteristics of the diverse materials. The internal stresses can cause structural failure and fluid leakage between the high and low pressure sides of the heat exchanger. Additionally present ceramic-metal heat exchangers are difficult to service and repair.

The present invention is directed to overcoming one or more of the problems set forth above. In particular, a ceramic to metal joint embodying the present invention includes separate means for bonding and sealing the joint between the ceramic and metal members. In a specific embodiment of such a joint, a recuperator tube assembly includes a ceramic tube that is permanently bonded to a metal sleeve which, in turn, is easily threaded into a metal manifold or header assembly. This construction allows a plurality of such tube assemblies to be assemblied into a modular manifold or header unit. Further, each tube assembly in the module can be removed for cleaning or replacement and is free to expand or contract independently of other tube assemblies in the module.

DISCLOSURE OF THE INVENTION

In accordance with one aspect of the present invention a ceramic to metal joint includes a metallic member encircling and spaced from a portion of a ceramic member, and cooperating with the ceramic member to form a partially closed chamber therebetween. A bonding material is disposed in at least a portion of the chamber and contacts both the ceramic and metallic members. Further, a seal member is positioned between the ceramic and the metallic member to provide a fluid seal between the ceramic and metallic members.

BEST MODE FOR CARRYING OUT THE INVENTION

Figure 1:
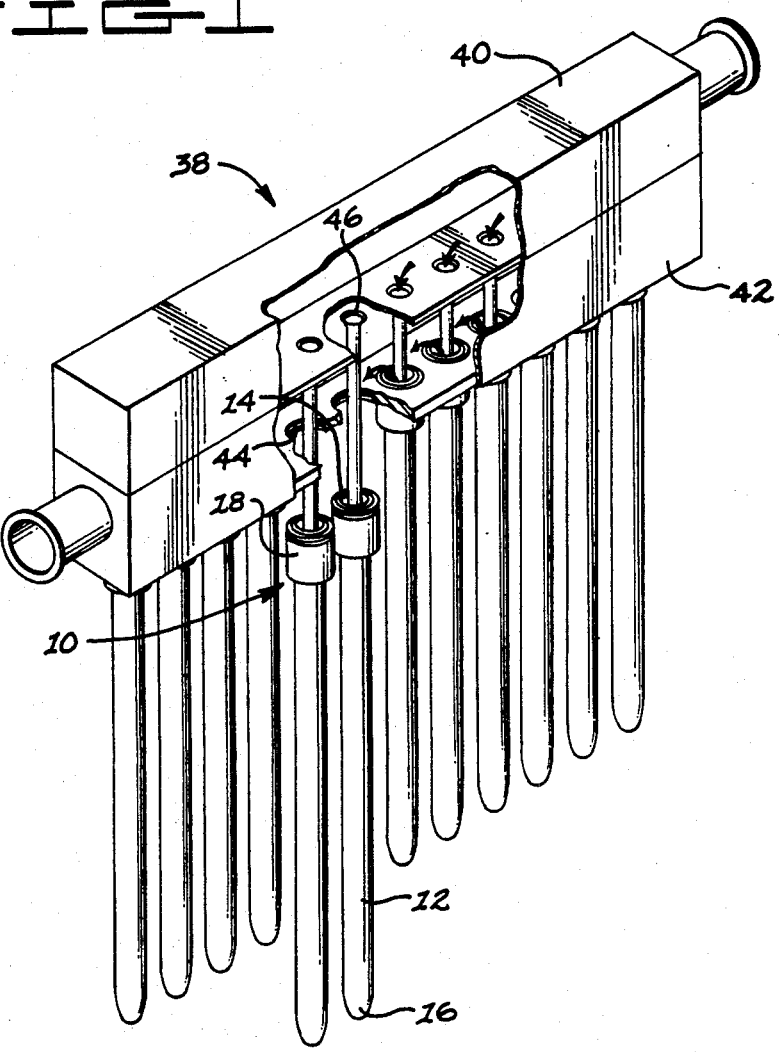
FIG. 1 is a perspective view of a recuperator module having a tube assembly embodying the present invention.

A recuperator tube assembly 10 includes a hollow, elongate ceramic tube 12 having an upper open end 14 and a spaced closed end 16. In the illustrated embodiment, the tube 12 is formed of an extruded and sintered alpha-phase silicon carbide material. The ceramic tube 12 is joined near its open end 14 to a metal sleeve 18. The metal sleeve 18, preferably formed of stainless steel or other high temperature resistant alloy, has a plurality of external threads 20 formed on the sleeve at an end of the sleeve adjacent the open end of the tube 12. The opposite, or distal, end of the metal sleeve 18 has an inwardly extending flange 22. The inner diameter of the flange 22 is greater than the outer diameter of the tube 12 so that the flange 22, as well as the sleeve 18, encircles the tube in non-contacting relationship and cooperates with the outer wall of the tube to form a partially closed chamber 24.

Figure 2:
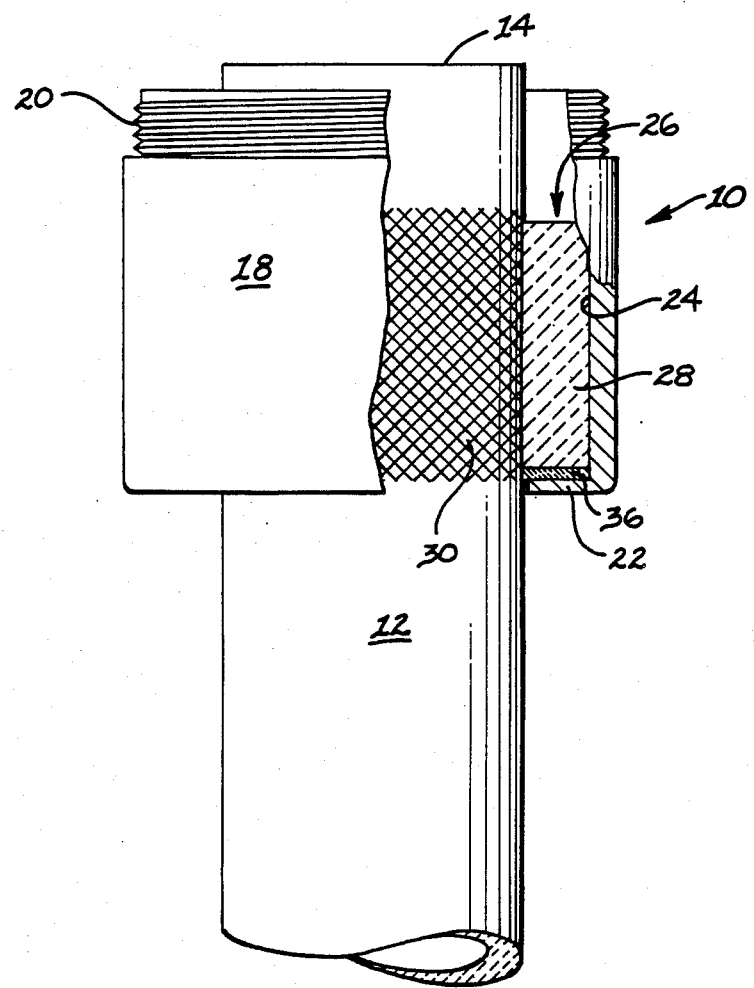
FIG. 2 is a view, partly elevational and partly sectional, view of a recuperator tube assembly having a ceramic to metal joint constructed according to one embodiment of the present invention.
Figure 3:
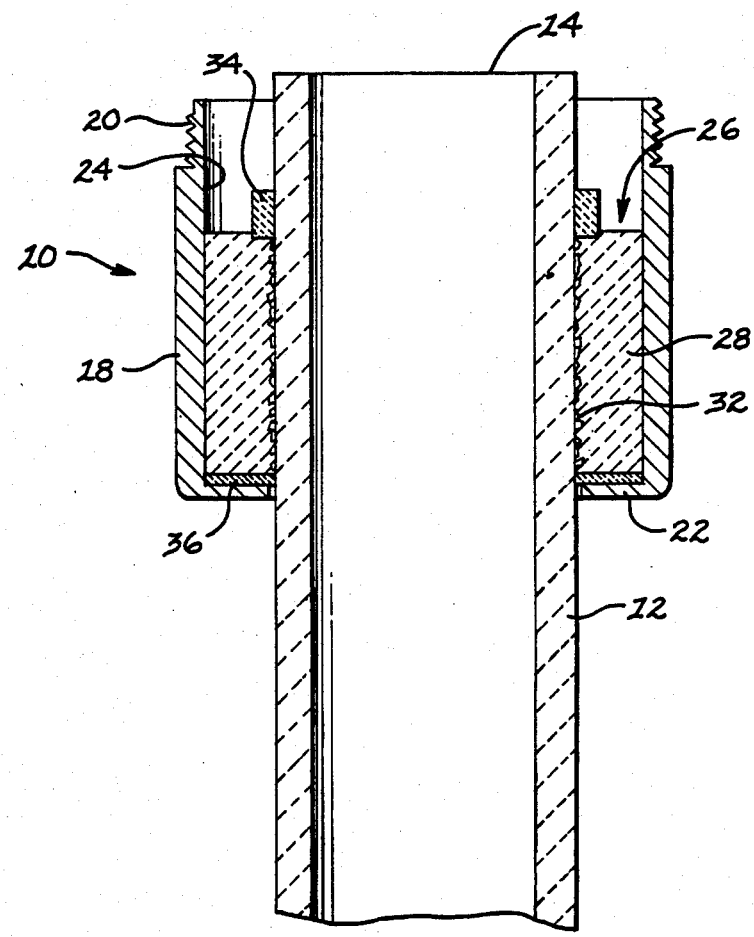
FIG. 3 is a sectional view of a ceramic to metal joint constructed according to a second embodiment of the present invention.

The tube 12 and sleeve 18 are joined by a ceramic to metal joint 26 that includes a bonding material 28 disposed in the partially closed chamber 24 between the ceramic tube and the metal sleeve. In the illustrative embodiments, the bonding material 28 is a dense castable refractory material having a composition, by weight, of about 70% $Al_2O_3$, 25% $SiO_2$, and 5% trace elements. As a matter of convenience, the bonding material 28 may be formed by modifying a premixed, dry particulate material used as a furnace lining. One such commercially available material is sold by Babcock and Wilcox Co., New York, N.Y. under the trademark name Kaocrete 32-C. This material, as purchased, is a mixture of aggregate and fine particles, the fine particles comprising about 60% of the total mixture and defined as that portion of the mixture that will pass a no. 18 sieve, i.e., a sieve having a nominal opening of about 0.0394 in. (1.0 mm). The bonding material 28 is prepared by modifying the above-described pre-mixed blend of dry particulate materials by first separating the aggregate and fine particles. The separated aggregate particles are then crushed, such as by ball milling, to fracture the aggregate into smaller, irregularly-shaped, sharp-edged particles that will pass a no. 10 sieve, i.e., a sieve having a nominal opening of about 0.0787 in. (2.0 mm). The crushed and sized aggregate particles are then recombined with the previously separated fine particles and mixed with distilled water in an amount sufficient to form a flowable slurry. The prepared slurry is cast in situ into the chamber 24 between the tube 12 and the sleeve 18 and allowed to cure at normal room temperature for 24 hours. After room-temperature curing, the bond is further cured for 12 hours at 400° F. To improve adhesion of the cast bonding material 28 to the surface of the ceramic tube 12, the tube 12 may be lightly scored, such as by knurling 30 as shown in FIG. 2, while still green, prior to sintering. Alternatively, a coating 32 may be applied to the surface of the tube 12 as shown in FIG. 3. A suitable coating may be formed by brush applying an aqueous slurry of silicon powder and small (1/16 inch) silicon carbide chips. After application, the coating is fuzed to the tube surface by heating in a non-reducing atmosphere.

In high pressure applications, the fluid pressure on one side of the joint is generally significantly higher than on the other side, and it may be desirable to provide additional mechanical locking means to prevent dislocation of the tube 12 with respect to the bonding material 28. One such form of mechanical assistance is provided by a ceramic retaining ring 34, shown in FIG. 3, which is brazed to the tube 12 surface prior to casting the bonding material between the tube and sleeve 18. The ceramic ring 34 may be formed of a material similar to the material of the tube, i.e., silicon carbide, and bonded to the tube by brazing. The brazing can be effected by first applying a brazing compound, such as an aqueous slurry of silicon powder to the braze joint area, and then heating the tube end area and ring 34 in a non-reducing atmosphere, such as argon gas. If the above described silicon powder—silicon carbide chip coating 32 is applied to improve adhesion of the bonding material 28 to the tube 12 surface, it is convenient to braze the ring 34 and fuze the coating 32 in the same furnace heating operation.

The ceramic to metal joint 26 embodied in the present invention also includes a seal member 36 positioned between the ceramic and metallic members. In the illustrative embodiment, the seal member is a glass washer 36 placed in the chamber 24 prior to casting the bonding material 28 into the joint. The glass washer 36 rests against the inwardly extending flange 22 of the metal sleeve 18, and has inner and outer diameters substantially equal respectively, to the outer tube diameter and inner sleeve body diameter. Whereas the bonding material 28 is a substantially brittle refractory member, the seal member 36 is constructed of a material that softens and is somewhat ductile at the design or intended operating temperature of the joint assembly 26. Specifically, the seal member is desirably constructed of a glass material having sufficient ductility within a predetermined thermal operating range to plastically deform relative to the bonding material 28 or the metal flange 22 and yet remain a solid, continuous body capable of providing an effective seal between the ceramic and metal components of the joint. Examples of suitable types of glasses and their corresponding effective ductile-sealing ranges are as follows:

A. Single phase borosilicate glass 1400° F. to 1600° F. (760° C.–871° C.);
B. Single phase calcium-barium borosilicate glass 1400° F. to 1600° F. (760° C.–816° C.);
C. Two phase aluminosilicate glass 1650° F. to 2000° F. (899° C.–1093° C.);
D. Quartz glass 2500° F. to 3029° F. (1371° C.–1665° C).

The glass seal member 36 provides an effective seal even though the more brittle bonding material 28 may crack under repeated thermal stress loading. In the absence of the seal member 36, gaseous fluids could leak through cracks in the bonding material 28 that may develop during operation. The glass seal, because of its selected material properties, softens somewhat at the designed operating temperatures, does not crack, but does comply with the adjacent materials, and thereby provides a blockage to the flow of gases between the ceramic and metal components of the joint.

Industrial Applicability

The recuperator tube assembly 10 is particularly useful when incorporated in a removable heat exchange module 38 as shown in FIG. 1. The module 38, having a tube-within-a-tube configuration, includes a metal inlet, or high pressure, header 40, and a similar metal exhaust, or low pressure, header 42. A plurality of internal threads 44 are formed in the low pressure header 42 to receive the threaded metal sleeve 18 of the recuperator tube assembly 10. A hollow metal tube 46 having an outer diameter less than the inner diameter of the ceramic tube 12, is attached to the inlet header 40 by mechanical means, such as threads or brazing. The metal tube 46 passes through the chamber defined by the exhaust header 42 and extends coaxially inside the ceramic tube 12 so that the distal end of the metal tube is near the lower, or closed, end of the ceramic tube. The metal tube is maintained in concentric relationship with the inner wall of ceramic tube by suitable spacers, not shown, thereby defining a uniform annular passage between the outer wall of the metal tube 46 and the inner wall of the ceramic tube 12.

In typical operation, as illustrated by the flow-indicating arrows in FIG. 1, cool gas enters the chamber defined by the inlet header 40, and passes downwardly through the interior of the metal tube 46. After exiting from the lower end of the metal tube, the gaseous medium is directed upwardly through the annular chamber between the metal and ceramic tubes. Hot gas is directed against the outer surface of the ceramic tube 12 and heat is conducted through the tube to the inner wall surface, and the cool gas is thus heated as it passes through the annular cavity. Upon exiting the annular cavity, the heated gas enters the chamber defined by the exhaust header 42 and is subsequently discharged from the module 38.

The recuperator tube assembly 10 makes possible the construction of a fully assembled heat exchanger module 38 having predetermined flow and thermal transfer characteristics. By combining air flow in paired or multiple modules, a multi-pass heat exchanger can be configured to almost any desired capacity. Further, an individual module can be easily removed for cleaning, inspection or replacement. Another advantage is that individual tubes 12 in a module 38 can be easily field replaced. Additionally, only ceramic elements are exposed to the high temperature and potentially damaging environment. Still further, the ceramic to metal joint 26 provides a permanent leak-free bond between the ceramic heat transfer member 12 and the metal mechanical attachment member 18.

Other aspects, objects and advantages of this invention can be obtained from a study of the drawings, the disclosure and the appended claims.

We claim:

1. A ceramic to metal joint comprising:
   a ceramic member;
   a metallic member encircling said ceramic member in spaced relationship thereto to therewith define a partially closed chamber;
   a bonding material disposed in at least a portion of said chamber and contacting both said ceramic and said metallic members; said bonding material being formed by casting, in situ, an aqueous slurry of a refractory material having a composition including $Al_2O_3$ and $SiO_2$ and comprising a blend of sharp-edged aggregate particles less than 2.0 mm in size and fine particles less than 1.0 mm in size; and,
   a seal member interposed said ceramic and said metallic members.

2. The ceramic to metal joint, as set forth in claim 1, wherein said seal member softens without melting within a predetermined thermal operating range to provide an effective fluid seal between said interposed members at said range.

3. The ceramic to metal joint, as set forth in claim 1, wherein said bonding material comprises a blend of about 40% by weight aggregate particles and about 60% by weight fine particles.

4. The ceramic to metal joint, as set forth in claim 3, wherein the dense castable refractory material is a composition of 70% by weight $Al_2O_3$, 25% by weight $SiO_2$, and 5% by weight trace elements.

5. A replaceable recuperator tube assembly, comprising:
   an elongate tube constructed of a ceramic material and having at least one open end;
   a metal sleeve positioned adjacent said open end in circumscribing relationship with respect to said tube;
   means for selectively attaching said sleeve to a header assembly;
   means for bonding said tube to the sleeve; and,
   a seal member interposed the ceramic tube and the metal sleeve.

6. The tube assembly, as set forth in claim 5, wherein said means for selectively attaching said sleeve to a header assembly includes an external thread formed on the sleeve and a mating internal thread formed on the header assembly.

7. The tube assembly, as set forth in claim 5, wherein said means for bonding said tube to the sleeve includes a dense castable refractory material disposed between an outer surface of said tube and an inner surface of said sleeve.

8. The tube assembly, as set forth in claim 7 wherein said assembly includes a ring-shaped member positioned on the outer surface of said tube and bonded thereto, and contacting at least a portion of said dense castable refractory material.

9. The tube assembly, as set forth in claim 7, wherein said metal sleeve has a radially inwardly extending flange at one end, and said seal member includes a glass washer abutting said flange and contacting at least a portion of said dense castable refractory material.

10. The tube assembly, as set forth in claim 9, wherein said tube assembly, has a predetermined thermal operating range, and said seal member has sufficient ductility in said thermal operating range to move relative to at least one of said castable refractory material and said metal sleeve while remaining a continuous body and providing an effective fluid seal between said ceramic tube and said sleeve.

11. In a ceramic to metal joint having a ceramic member and a metallic member spaced from the ceramic member, the improvement comprising;
    a refractory member disposed between respective first portions of the ceramic and metallic members and bonded respectively to said ceramic and metallic members, said refractory member being formed by casting, in situ, an aqueous slurry of refractory material comprising a blend of sharp-edged aggregate and fine particles; and,
    a preformed seal member interposed between respective second portions of the ceramic and metallic members, said seal member being constructed of a material that softens without melting within a predetermined thermal operating range of said joint to provide an effective fluid seal at said range.

* * * * *